Dec. 24, 1935.  F. P. MEYER  2,025,173
BOOT AND SHOE TREE
Filed April 4, 1934   4 Sheets-Sheet 1
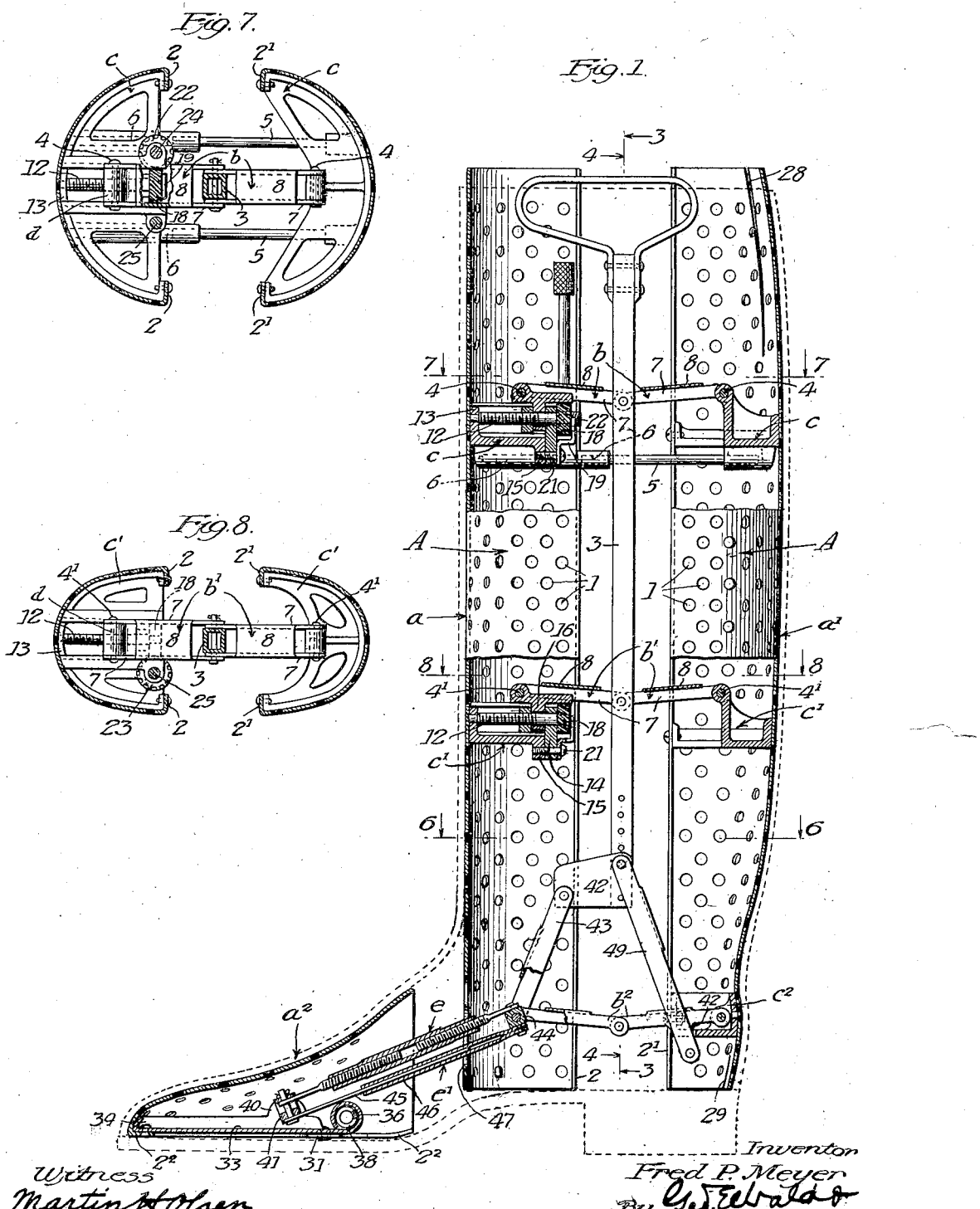

Dec. 24, 1935.  F. P. MEYER  2,025,173
BOOT AND SHOE TREE
Filed April 4, 1934  4 Sheets-Sheet 2
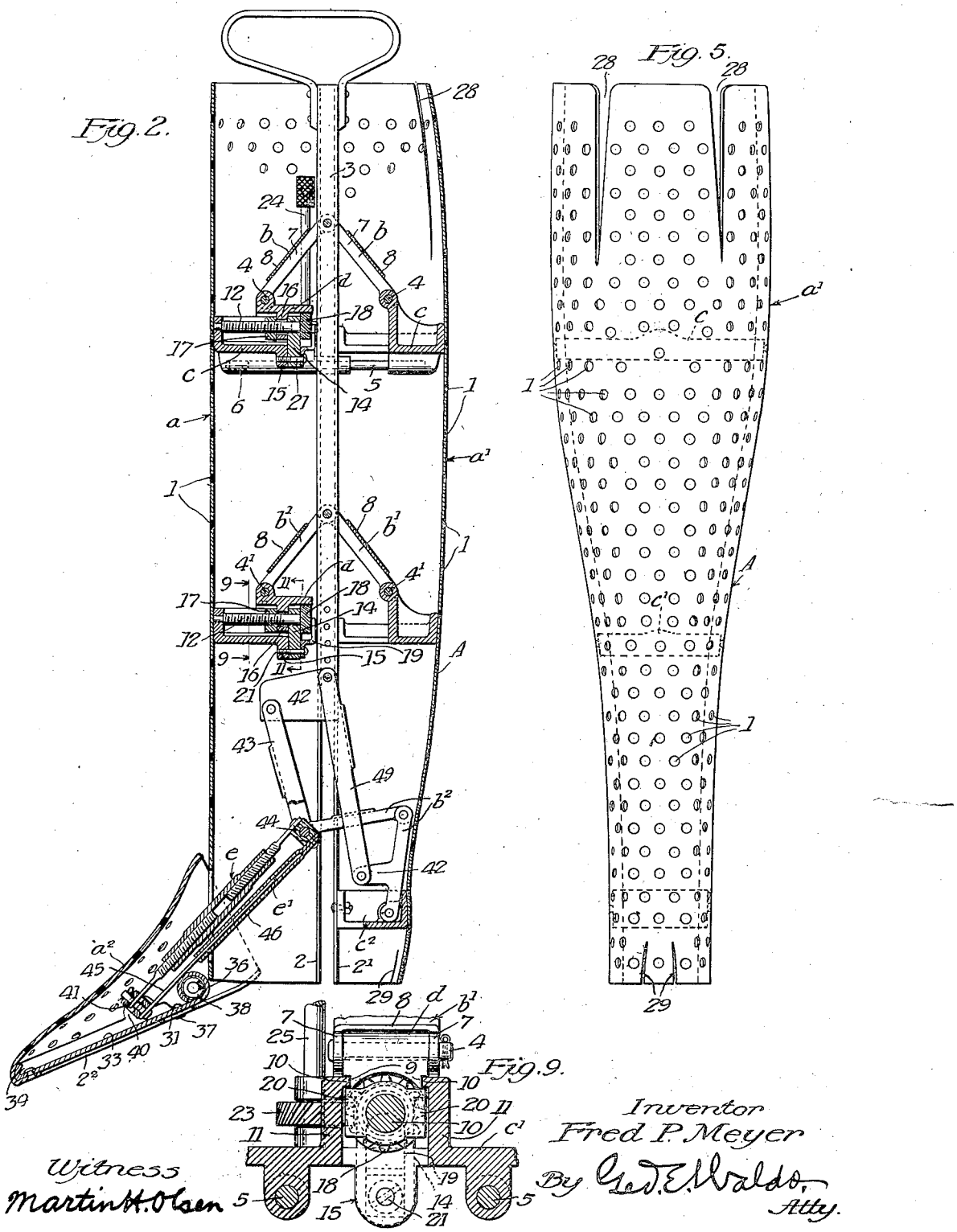
Witness
Martin H. Olsen
Inventor
Fred P. Meyer
By Geo. E. Waldo,
Atty.

Dec. 24, 1935.　　　　F. P. MEYER　　　　2,025,173
BOOT AND SHOE TREE
Filed April 4, 1934　　　4 Sheets-Sheet 3
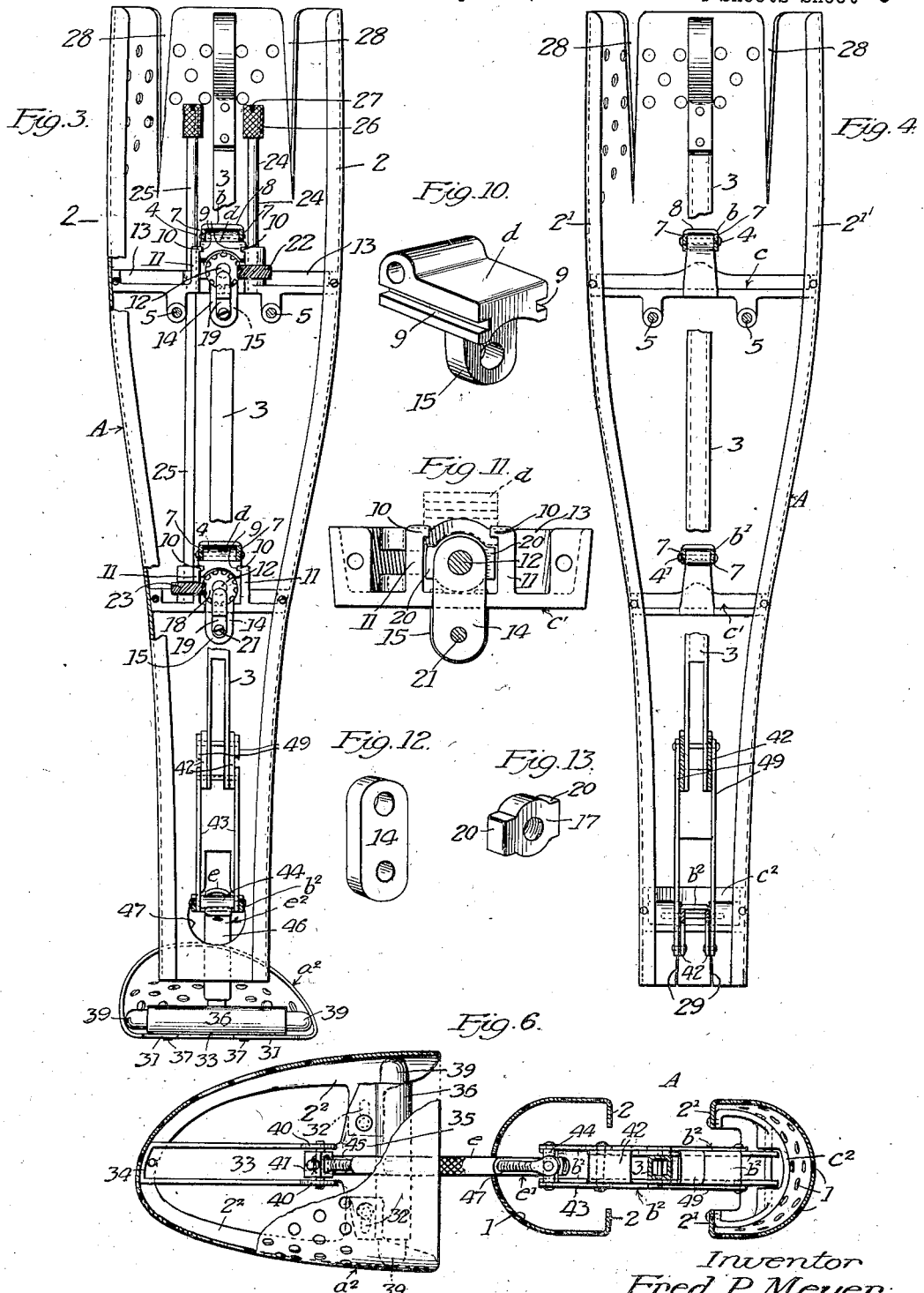

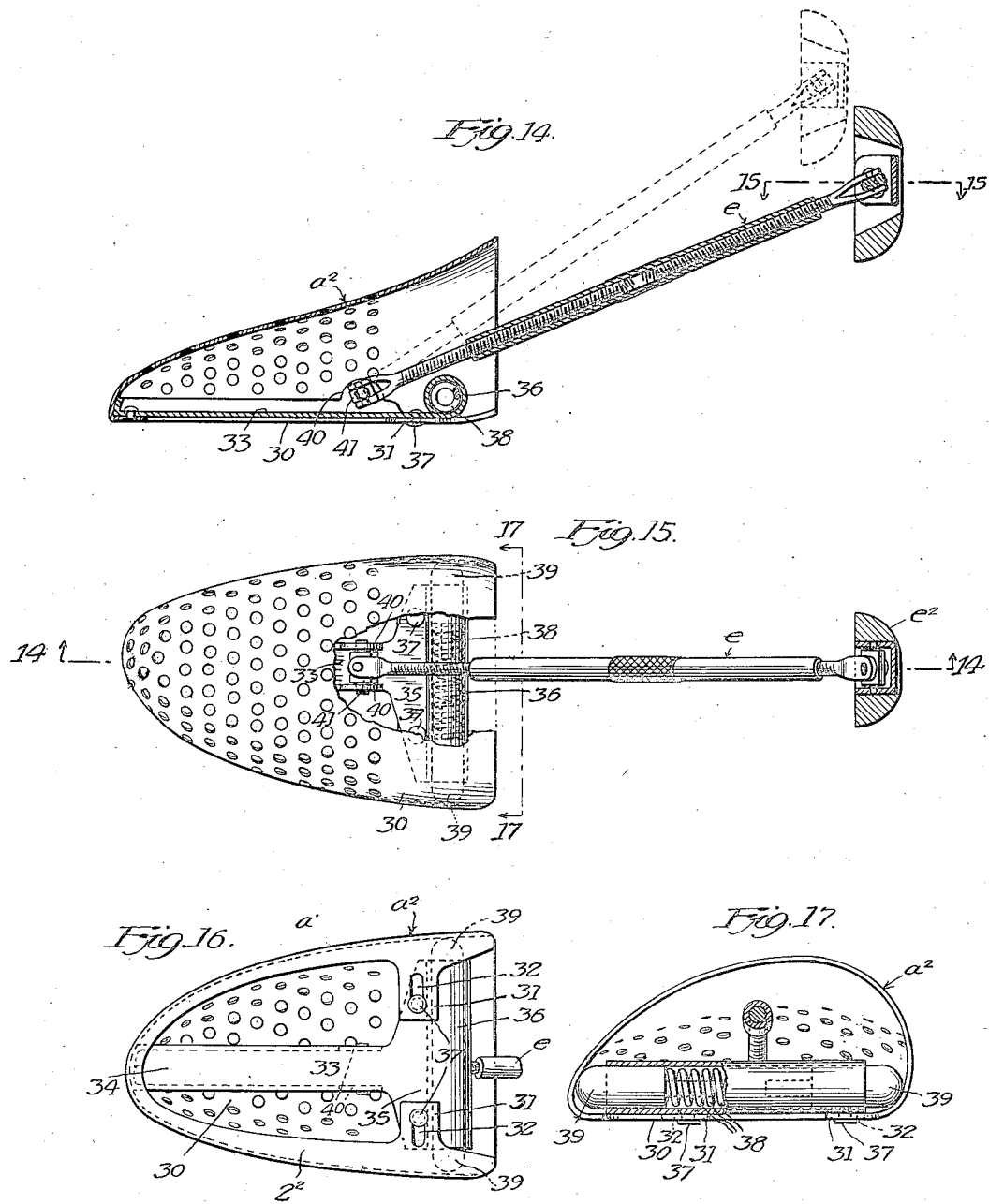

Patented Dec. 24, 1935

2,025,173

UNITED STATES PATENT OFFICE 2,025,173

BOOT AND SHOE TREE

Fred P. Meyer, Seattle, Wash.

Application April 4, 1934, Serial No. 718,979

22 Claims. (Cl. 12—117)

This invention relates to trees for shaping boots and shoes.

Important objects of the invention are:

To provide a tree for the purpose specified including operating means therefor, the different parts of which are operatively connected to form a single unitary structure, which may be inserted into and withdrawn from a boot as a unit;

Which, after being inserted into a boot, may be distended and collapsed by manipulation of a single operating member;

Which may readily and accurately be adjusted for use with boots of different sizes;

Which, having been adjusted, will retain its adjustment until changed manually;

Which will be relatively much lighter in weight than other comparable trees of which I have any knowledge;

The width of the foot portion of which is variable and is constructed and arranged to conform automatically to differences in width of boots and shoes with which it is designed for use, within contemplated limits;

The design of which, within the scope and contemplation of the invention, may readily be varied to provide trees adapted for use with boots or shoes having either high or low heels, respectively;

Which is constructed to ventilate the inner surface of the boot; and

The foot portion of which may readily be adapted for use as a shoe tree.

Other objects of the invention will hereafter appear.

To effect the various objects thereof, a tree embodying my invention and improvements, comprises the various features, combinations of features and details of construction hereinafter described and claimed.

In the accompanying drawings in which the invention is fully illustrated,

Figure 1 is a central, vertical sectional side view of a boot tree embodying my invention and improvements, lengthwise through the foot portion thereof, the tree being shown distended and as applied in use to a boot, shown in dotted lines.

Figure 2 is a view of the tree, substantially similar to Fig. 1, showing the tree collapsed and removed from the boot.

Figures 3 and 4 are sectional elevations on the lines 3—3 and 4—4 of Fig. 1, looking in opposite directions, as indicated by the arrows.

Figure 5 is a view of the rear portion of the tree from the right side of Fig. 2.

Figures 6, 7 and 8 are plan sections substantially on the lines 6—6, 7—7 and 8—8, of Fig. 1.

Figure 9 is an enlarged, detail sectional elevation on the line 9—9, Fig. 2; and Figures 10, 11, 12 and 13 are enlarged detail views.

Figure 14 is a sectional side view, substantially on the line 14—14 of Fig. 15, showing the adaptation of the foot portion of my improved boot tree for use as a shoe tree.

Figure 15 is a top plan view, broken away, in part, to disclose underlying parts, and partly in section on the line 15—15 of Fig. 14.

Figure 16 is a bottom plan view of the vamp portion of the tree and of the means for mounting the same; and Figure 17 is a view of the vamp portion of the tree and of the means for mounting the same, from the position 17—17 of Fig. 15.

Describing the invention with reference to the drawings, my improved tree, designated as a whole A, comprises separate front and rear leg portions designated, respectively, as a whole $a$, $a'$, and a foot portion designated as a whole $a^2$, all of which are made of suitable sheet material, preferably vulcanized fiber, which will be as thin as consistent with requisite strength.

The different tree portions, $a$, $a'$, $a^2$, define the contour of the finished tree and, for reasons presently explained, are provided, practically throughout, with perforations 1. As shown, also, inwardly extending, marginal flanges, are formed on the opposed edges of the leg portions $a$, $a'$, and around the bottom edges of the foot portion $a^2$, the flanges on the front and rear leg portions $a$, $a'$ being designated 2, 2', respectively, and the flange on the foot portion $2^2$. Said flanges operate to reinforce and stiffen the leg and foot portions of the tree and also provide for making attachments thereto which will be strong and also, will impart to them a neat and finished appearance.

In accordance with the invention, the leg portions $a$, $a'$ of the tree, are operatively connected intermediate their ends, by toggle-levers, respectively designated as a whole $b$, $b'$, the articulated ends of which are pivoted to the operating rod or member 3, and the remote ends of which are pivoted, respectively, at 4, 4', to upper and lower sets of frame members $c$, $c'$, secured to the inner sides of the front and rear leg portions $a$, $a'$, of the tree, as best shown in Figs. 1 and 2, said frame members conforming to the shape or contour of said leg portions, respectively, and being rigidly attached to the marginal flanges 2, 2' at their ends and to said leg portions $a$, $a'$, intermediate their ends, as best shown in Figures 7 and 8. In addition to forming abutments for making attachments to said leg portions $a$, $a'$, said frame members will also operate to reinforce and strengthen said leg portions, in an obvious manner. Also, to render said frame members as light in weight as possible they, preferably, are made of aluminum or an aluminum alloy, and preferably, also, will be skeletoned, as best shown in Figures 7 and 8.

Said frame members may be produced conveniently and economically either as die castings or sand castings, or by stamping them from suitable sheet metal, or by a combination of castings and stampings.

The front and rear leg portions $a$, $a'$ of the tree, preferably are of the same length, as near as may be, and, in operation, are supported with their top and bottom ends, respectively, substantially even by slide members which are rigidly secured to one of said frame members, as shown to the upper frame member $c$, secured to the rear leg portion $a'$, and have sliding engagement with bearings formed in the corresponding member $c$ on the front leg portion $a$. As shown, said slide members consist of rods 5, which slidably engage holes 6, as clearly shown in Figures 1 and 7.

As shown, only the upper set of frame members is provided with guides, but they, obviously, may be readily applied to both sets of said frame members, if desired, as this would involve merely a duplication of the guide members and bearings therefor, just above described.

In the preferable construction shown, see particularly Figures 1, 2, 7 and 8, each toggle-lever $b$, $b'$ consists of links 7 rigidly connected between their ends by plates or webs 8, each of said members preferably forming an integral structure.

As shown, the frame members $c$, $c'$, secured to the rear leg section of the tree, form single integral pieces, while the frame members secured to the front leg section, comprise adjustably supported members to which the front toggle members 7 are pivoted directly, arranged for varying the leg size of the tree, to adapt it for use with boots the legs of which are of different size. As shown, the construction of said frame members $c$, $c'$ on the front leg portion $a$, to provide for adjusting the size of the leg portion of the tree to fit different sizes of boots, is as follows: The outer ends of the members $b$, $b'$ of said toggle-levers, applied to said front tree portion $a$, are pivoted directly to members $d$, which are provided in their opposite sides with guide bearings 9, which are slidably fitted to fixed bearing flanges 10 formed at the upper, inner edges of spaced side plates 11 forming parts of said members $c$, $c'$. For convenient reference, said members $d$ will be designated slide members. As shown, said slide members are adapted to be adjusted lengthwise of the bearing flanges 10 towards and from the frame members $c$, $c'$, secured to the front leg portion $a$, of the tree, by screws 12 rotatably mounted in fixed axial position in the flanges 13 of the said frame members $c$, $c'$, and in plates 14 secured to lugs 15 which depend from the bottoms of said members $c$, $c'$ and which overlap lugs 16 which depend from the under side of said slide members $d$ and are provided with holes through which the screws 12 pass freely. As assembled for use, the bearing plates 14 will contact with the lugs 15 and said lugs and plates will be confined between adjusting nuts 17 threaded to the screws 12 and gears 18 secured to the ends of said screws which project through their bearings in the plates 14, as shown.

When the nuts 17 are in contact with the lugs 16, rotation of the screws 12 in a proper direction will operate through said nuts to impart bodily movement to the frame members $c$, $c'$, and with them the front tree portion $a$ inwards towards the rear tree portion $a'$, thus reducing the leg dimension of the tree. Also, when the screws 12 are turned in the opposite direction which will impart outward movement to the nuts 17 on said screws, that is away from the lugs 16, bodily movement will be imparted to the frame members $c$, $c'$, therewith, by clips 19 secured to the lower ends of the bearing plates 14, the upper ends of which bear against the inner ends of the screws 12.

With the described construction, it is obvious that turning movement of the screws 12 will impart bodily movement to the front leg portion $a$ of the tree, towards or from the rear tree portion $a'$, as the case may be, correspondingly varying the leg dimension of the tree.

In operation, turning movement of the nuts 17 with the screws 12 is prevented by contact of lateral extensions 20 of said nuts with the lower lateral edges of the slide members $d$, when said screws are turned in one direction or the other, as the case may be.

Also, to provide for assembling and dismantling the parts of said slide members $d$, the bearing plates 14 and the clips 19 form separate parts and are secured in operative positions to the lugs 15 by screws 21, as shown, see Figures 2 and 3.

As best shown in Figures 3, 7 and 8, rotation is adapted to be imparted to the screws 12 to effect desired adjustment of the tree A, by means of intermeshing gears, comprising the gears 18 secured to the screws 12, and gears 22 and 23, respectively secured to rods 24, and 26, of which the rod 24 has a bearing in the upper frame member $c$, and the rod 25 has bearings in both the upper and lower frame members $c$, $c'$. Also to provide for conveniently turning the adjusting rods 24 and 25, said rods are provided with knurled heads 26, which may also be provided in their upper ends with slots 27 for engagement by a screw driver.

In order that the tree A, having been adjusted to proper size to fit a particular boot, may retain such adjustment until it is again changed by manipulation of the adjusting rods 24 and 25, the gears 18, 22 and 23 are substantially self-locking, being rendered so, when the tree applied to a boot is extended, by frictional engagement of the non-rotatable nuts 17 with the threads of the screws 12, produced by the thrust of the lugs 16 on the slide members $d$ against said nuts, when the tree operating member 3 is depressed to extend the toggle-levers $b$, $b'$, as will readily be understood. As shown, said gears are spiral gears, but my invention contemplates the use of any kind of gears suitable for the purpose.

In order that the upper and lower ends of my improved trees may readily accommodate themselves to the contours of different boots on which they are used, the tree portions $a$, $a'$, are provided in their opposite ends with slits 28 and 29, thus permitting flexure of the slit portions thereof, so that they will conform to the contours of the upper and lower ends of the leg portions of different boots with which they are used.

The toggle-levers $b$, $b'$, are arranged to flex upwards, an upward pull on the rod 3 operating first to flex said toggle-levers and thus collapse the leg portions $a$, $a'$, of the tree, and also affording means for withdrawing the tree from the boot as a unit.

To adjust the tree in operative relation into a boot, it is first inserted into the leg of the boot in collapsed condition and the rod 3 depressed to straighten the toggle-levers $b$, $b'$, which will spread the leg portions $a$, $a'$, apart and, if the tree is properly adjusted, will exert pressure against the inner side of the leg of the boot sufficient to stretch the same slightly and thus smooth out all creases and wrinkles.

As applied in use, the tree, in collapsed condition, is inserted into the leg of the boot and forced down until its lower end rests against the bottom of the boot, after which the rod 3 is forced down to straighten the toggle-levers $b$, $b'$, the relation being such that said toggle-levers will throw slightly past their dead points, in which positions they will be locked by contact of the lower ends of said tree sections with the bottom of the boot, as will readily be understood.

If, on adjusting the tree to the leg of a boot, it is found to be too large or too small for a particular boot, it may readily be adjusted to proper size by manipulation of the adjusting rods 24 and 25. In making such adjustment, the tree is inserted into the boot in collapsed condition and the rods 24 and 25 turned in one direction or the other, as it is desired to increase or decrease the leg dimensions of the tree, as will readily be understood.

In what I now consider preferable construction, the foot portion $a^2$ of the tree comprises a vamp portion 30 made of resilient sheet material—preferably perforated vulcanized fiber of suitable thickness to impart necessary strength and stiffness thereto.

In accordance with the invention, the bottom of said vamp portion 30 is open and formed on the lower edges thereof, are projections 31 which extend inwards towards each other and are provided with transverse slots 32. As shown, said vamp portion 30 is supported on a fitting designated as a whole 33, comprising a brace member 34 which extends lengthwise thereof and which, to impart requisite strength and stiffness thereto is made in the form of a channel. Said fitting also comprises a relatively wide, rear portion 35, the extreme, rear end of which is shaped to form a sleeve 36. As shown, the toe of the vamp portion 30 of the foot portion $a^2$ of the tree is secured to the front end of the brace member 34 of said fitting, which, as shown, is riveted directly to the flange $2^2$ formed on the lower edges of said vamp. Said vamp is also secured to said fitting adjacent its rear end by means of headed studs 37 secured in the under side thereof closely adjacent the sleeve 36, which extend through the slots 32 formed in the projections 31 on said vamp, as described, which overlap a flat under surface on said fitting.

In accordance with the invention, the vamp portion of said foot portion $a^2$ is maintained yielding at the limit of its expansion—defined by contact of the studs 37 with the proximate ends of the slots 32—by means of a coil spring 38, confined under compression, in the sleeve 36, and which reacts against opposite sides of the vamp portion 30 of the tree, preferably adjacent its rear end. As shown, also, plugs 39 are slidably fitted to opposite ends of the sleeve 36 against which the spring 38 reacts directly, the outer ends of said plugs being rounded, as shown, and bearing directly against opposite side of the vamp 30.

In accordance with the invention, the foot portion $a^2$ of the tree is supported on the rear leg section $a'$ thereof and the operating rod 3, in such manner that when the tree is collapsed, the toe of the vamp 30 will hang down, substantially as shown in Figure 2, so that it may be inserted downwards through the leg of the boot and into the foot thereof, substantially as shown in Figure 1, when the tree is extended.

In what I now consider preferable construction, the means for mounting the foot portion $a^2$ of the tree is as follows: Formed on the flanges of the brace member 34 at about the middle lengthwise of the vamp 30, are lugs 40, pivotally mounted in bearings formed in which is a pivot member 41, and secured to opposite sides of the operating rod or member 3 at its lower end are brackets 42, which project frontwards therefrom and pivoted to which adjacent their outer ends, are links 43 connected between their ends to form a rigid, unitary structure, and pivoted in bearings in the free ends of said links is a pivot member 44. The pivot members 41 and 44 are connected by links designated, respectively, as a whole $e$, $e'$, opposite ends of which are pivoted to said pivot members 41 and 44 in such relation that their pivotal axes will be substantially coincident and will be disposed at right angles to the pivotal axes of said pivot members respectively, forming in effect, universal joints.

The link $e$ is made in the form of a turnbuckle, thus providing for varying the length thereof and thus the position of the foot portion $a^2$ of the tree relative to the foot of a boot to which the tree is applied in use.

As shown, also the link $e'$ is extensible, comprising a flat-sided bar 45 which is slidably fitted to a correspondingly shaped hole formed in a sleeve member 46, the remote ends of said link members, respectively, being pivotally connected to different pivot members 41, 44, in the manner and relation heretofore described.

With the construction and relation described, it is obvious that the extensible link $e'$ will prevent turning movement of the foot portion $a^2$ of the tree on the turn-buckle link as an axis, which would tend to vary the adjustment of said foot portion relative to a boot to which the tree is applied in use, said turn-buckle link thus forming the sole means for varying the adjustment of the foot portion $a^2$ of the tree. As stated, said turn-buckle link is connected to the pivot members 41 and 44 by universal joints, thus permitting said foot portion to automatically adjust itself to varying alignments of different boots to which the tree is applied in use.

As shown, the turn-buckle link $e$ and the slidable extension link $e'$ associated therewith, project through an opening 47 formed in the front side of the front leg portion $a$ of the tree and which extends lengthwise thereof, contact of the link $e'$ with the bottom of said opening operating to define the inclination of the foot portion $a^2$ of the tree relative to the foot of a boot to which the tree is applied in use, when collapsed, and also serving to support the foot portion of the tree in position to align with the foot portion of a boot into which the tree is being inserted, whereby, as said tree is expanded, the foot portion will be guided and forced into the foot of the boot along the sole thereof.

As heretofore stated, when the tree is collapsed, the extensible link $e'$ and with it the foot portion $a^2$ of the tree, will be free to turn with the pivot member 44, but will be held from turning on its axis, the relation being such that, as the tree is expanded, said foot portion will be guided along the sole of a boot to which the tree is being applied, and forced into the foot of the boot by suitable means consisting, as shown, of toggle-levers comprising articulated members $b^2$, the remote ends of which are pivoted to a frame member $c^2$ secured to the inner side of the rear tree member $a'$ adjacent its lower end, and to the pivot member 44, and formed on the links of which pivoted to the frame member $c^2$, are lugs 48 which are connected by links 49 with the operating rod 3, the relation being such that when said operating rod is manipulated to expand the tree, the toggle-lever $b^2$ will be straightened, producing a thrust on the foot portion $a^2$ of the tree through the turn-buckle link $e$, which will force said foot portion of the tree into the foot of the boot, the flexibility of the means for mounting said foot portion, permitting it to accommodate itself to differences of alignment thereof, while the turn-buckle $e$ provides means for adjusting said foot portion to the size of the boot.

In accordance with the invention, the foot portion of the tree may, separately, readily be adapted for use as a shoe tree, by the simple expedient of detaching the turn-buckle link or thrust-member $e$ from the leg portion of the boot tree, and mounting an abutment member $e^2$ on the outer end thereof, preferably by means of a joint constructed and arranged to permit said abutment member to turn freely in different directions. As shown, said abutment member is shaped and arranged—being, as shown, rounded—in such manner, that when properly adjusted, it will exert a wedging action against the heel of the shoe when inserted into the same, which will force the vamp portion 30 of the tree into the shoe to which it is applied. In this adaptation, the extension link $e'$ may or may not be dispensed with, as may be desired.

Such an adaptation is shown in Figures 14 to 17, inclusive, of the drawings, corresponding parts of which and of the boot tree shown in Figures 1 to 13 being substantially similar and designated by the same reference characters, and which will readily be understood from an examination of the drawings—in connection with the preceding description—without repetition.

Briefly stated, with reference to Figs. 14 to 17, $a^2$ designates the shoe tree as a whole; 30 the vamp portion thereof; 33 the fitting as a whole, on which said vamp is supported; 34 the brace member of the fitting which extends lengthwise of the tree and the front end of which is riveted to the flange $2^2$ formed around the lower edge of the vamp 30; 35, the relatively wide rear portion of said fitting; 31, the projections on the lower edge of the vamp 30; 37, the headed studs secured in said fitting which extend through the slots 32 in the projections 31 and which limit expansion of the vamp portion 30 of the tree; 38, the coil spring which maintains the vamp yieldingly at the limit of its expansion; 36, the sleeve in which said expansion spring is confined; 39, the round-ended plugs slidably fitted to opposite ends of said sleeve, against which the spring 38 reacts and which bear directly against opposite sides of the vamp 30 to expand the same; $e$, the turn-buckle link, an end of which is pivotally connected, by a universal joint, to the member 41 pivotally mounted in bearings formed in lugs 40 on the flanges of the brace member 34, the pivotal axis of which extends at right angles to the axis of the pivot connecting the turn-buckle link $e$ to said pivot member 41; and $e^2$, the abutment member mounted at the outer end of the turn-buckle link $e$, also by a universal joint, the surface of which designed to contact with the heel of a shoe to which the tree is applied, being rounded, whereby it will exert a wedging action against the heel of a shoe to which the tree is applied, which will exert a thrust on the link $e$ which will force the tree into the shoe.

A particular advantage inherent in my improved tree is that, within the limits contemplated, the vamp portion of the tree will automatically accommodate itself to differences in the width of shoes with which it is used.

I claim:

1. In a boot-tree, the combination of separate front and rear sections made of sheet material shaped to conform to and which define the contour of the leg portion of the finished tree, frame members secured to the inner sides of said leg sections and arranged in spaced sets lengthwise thereof, toggle levers the remote ends of which, respectively, are pivoted to frame members of difference sets, an operating member to which the articulated ends of said toggle levers are pivoted, and guide means which connects a set of said frame members constructed and arranged to movably support the leg sections of the tree in operative relation, and to permit movement of said leg sections towards and from each other.

2. The boot-tree specified in claim 1, in which the guide-means which connects said frame members, consists of a rod or rods secured to one thereof and having sliding engagement with a bearing or bearings in the other.

3. The tree specified in claim 1, the leg sections of which comprise inwardly projecting flanges on their longitudinal edges.

4. The tree specified in claim 1, in which the marginal flanges on the longitudinal edges of the leg sections of the tree project inwards over and are rigidly secured to surfaces of said frame members.

5. The tree specified in claim 1, the leg and foot portions of which are made of fiber and are provided with perforations over substantially all surfaces thereof designed to contact with a boot to which said tree is applied.

6. The tree specified in claim 1, which comprises means for varying the size of the leg thereof to fit boots of different sizes, accessible for operation when the tree is applied to a boot.

7. The tree specified in claim 1, which comprises means for varying the size of the leg thereof to fit boots of different sizes, comprising a member slidably mounted on one of each set of frame members secured to the leg sections of the tree to which a toggle-lever is connected, means for effecting relative adjustment of said slide member and the frame member on which it is mounted to vary the size of the leg of the tree, and means to define full operative extension of the leg portion of the tree for different adjustments thereof.

8. The tree specified in claim 1, which comprises means for varying the size of the leg thereof to fit boots of different sizes, comprising a member slidably mounted on one of each set of frame members secured to the leg sections of the tree, to which a toggle-lever is pivoted, means for effecting relative adjustment of said slide members and the frame members on which they are mounted, respectively, to vary the size of the leg of the tree, consisting of screws rotatably mounted in fixed endwise adjustment in bearings in the frame members on which said slide members are mounted, nuts which have threaded engagement with said screws respectively, arranged in the paths of movement of rigid parts of said slide members, respectively, to define full extension of the leg of the tree, and manually operable means for rotating said screws.

9. The tree specified in claim 1, which comprises means for varying the size of the leg thereof to fit boots of different sizes, comprising a member slidably mounted on one of each set of frame members secured to the leg sections of the tree, to which a toggle-lever is pivoted, means for effecting relative adjustment of said slide members and the frame members on which they are mounted, respectively, to vary the size of the leg of the tree, consisting of screws rotatably mounted in fixed endwise adjustment in bearings in the frame members on which said slide members are mounted, nuts which have threaded engagement with said screws, respectively, arranged in the paths of movement of rigid parts of said slide members, respectively, to define full extension of the leg of the tree, manually operable means for rotating said screws, and means to prevent rotation of said nuts with said screws.

10. The tree specified in claim 1, which comprises means for varying the size of the leg thereof to fit boots of different sizes, comprising a member slidably mounted on one of each set of frame members secured to the leg sections of the tree, to which a toggle-lever is pivoted, means for effecting relative adjustment of said slide members and the frame members on which they are mounted, respectively, to vary the size of the leg of the tree, consisting of screws rotatably mounted in fixed endwise adjustment in bearings in the frame members on which said slide members are mounted, nuts which have threaded engagement with said screws, respectively, arranged in the paths of movement of rigid parts of said slide members, respectively, to define full extension of the leg of the tree, and manually operable means for rotating said screws, consisting of shafts rotatably mounted in bearings formed in the frame members on which said slide members are mounted, and intermeshing gears secured to said shafts and to the adjusting screws mounted on said frame members, respectively.

11. The tree specified in claim 1, which comprises means for varying the size of the leg thereof to fit boots of different sizes, comprising a member slidably mounted on one of each set of frame members secured to the leg sections of the tree, to which a toggle-lever is pivoted, means for effecting relative adjustment of said slide members and the frame members on which they are mounted, respectively, to vary the size of the leg of the tree, consisting of screws rotatably mounted in fixed endwise adjustment in bearings in the frame members on which said slide members are mounted, nuts which have threaded engagement with said screws, respectively, arranged in the paths of movement of rigid parts of said slide members, respectively, to define full extension of the leg of the tree, and manually operable means for rotating said screws, consisting of shafts rotatably mounted in bearings formed in the frame members on which said slide members are mounted, intermeshing gears secured to said shafts and to the adjusting screws mounted on said frame members, respectively, and means for securing said gears from rotation when the tree is applied to a boot and is operatively extended.

12. A boot tree comprising separate front and rear leg sections, and a foot portion all made of sheet material, toggle-levers spaced lengthwise of the leg of the tree which flexibly connect the leg sections thereof, an operating member to which the articulated ends of said toggle-levers are pivoted, and means for mounting the foot portion of the tree in operative association with the leg sections and operating member of the tree, the relation being such that all parts of said tree may be inserted into a boot and withdrawn therefrom as a unit by manipulation of the operating member to collapse and expand said tree.

13. A boot tree comprising separate front and rear leg sections and a foot portion made of sheet materials, toggle-levers spaced lengthwise of the leg of the tree which flexibly connect the leg sections thereof, an operating member to which the articulated ends of said toggle-members are pivotally connected, and means for mounting the foot portion of the tree in operative association with the leg sections thereof, comprising a suspension link pivoted to the operating member adjacent its lower end, a thrust member one end of which is pivoted to the free end of said suspension link, and to the opposite end of which the foot portion of the tree is pivoted, the joints for pivoting said thrust member and foot portion being constructed and arranged to provide for free turning movement of said foot portion in different directions to permit it to adjust itself to the foot of a boot to which the tree is applied, a toggle-lever, the remote ends of which, respectively, are pivotally connected to the connected ends of said suspension link and thrust member, and to the rear leg section of the tree adjacent its lower end, and a separate link opposite ends of which are pivotally connected to the operating member of the tree and to a member of said toggle-lever intermediate the ends of said lever, the relation being such that pressure applied to the operating member will exert a thrust on the foot portion of the tree, and a pull on said operating member will exert a pull on said foot portion.

14. The tree specified in claim 13, in which the link connecting the operating member with the toggle-lever applied to the thrust member on which the foot portion of the tree is mounted, is pivoted to a lug formed intermediate the ends of the rear toggle member, which depends therefrom when said toggle-member is extended.

15. The boot tree specified in claim 13, which comprises a bracket member secured to the operating member and which projects frontwards therefrom, to which the suspension link for the connected ends of the thrust member and toggle-lever is pivoted directly.

16. The boot tree specified in claim 13, in which the link or thrust member on which the foot portion of the tree is mounted, is of turn-buckle construction, and which comprises means to prevent turning movement of said foot portion about said turn-buckle link as an axis.

17. The boot tree specified in claim 13, in which the link or thrust member on which the foot portion of the tree is mounted, is of turn-buckle construction, and which comprises means to prevent turning movement of said foot portion about said turn-buckle link as an axis, consisting of telescoping members having flat engaging surfaces, the remote ends of which, respectively, are pivotally connected to pivot members mounted to turn in bearings formed, respectively, on the foot portion of the tree and in the end of the link which connects the operating member of the tree with the connected ends of the toggle-lever and link or thrust member applied to said foot portion, said pivot bearings being constructed and arranged to permit free-turning movement and adjustment of said telescoping member and associated link, except on a longitudinal axis.

18. The boot tree specified in claim 13, the front leg portion of which is provided adjacent its lower end with an opening through which the link or thrust member extends on which the foot portion of the tree is mounted directly, said opening extending lengthwise of said leg portion and its lower end being closed, the relation being such that when the tree is collapsed the foot portion of the tree will hang pendant to permit it to be inserted into a boot.

19. The boot tree specified in claim 13, the front leg portion of which is provided adjacent its lower end with an opening through which the link or thrust member extends on which the foot portion of the tree is mounted directly, said opening extending lengthwise of said leg portion and its lower end being closed, the relation being such that when the tree is collapsed the foot portion of the tree will hang pendant to permit it to be inserted into a boot and such also that when inserting the tree into a boot, the foot portion of the tree will be supported in position to align with and, as the tree is extended, will be guided and forced into the foot of the boot along the sole thereof.

20. A tree for the purpose specified, comprising a vamp portion made of resilient sheet material, the bottom of which is open, inward projections at the lower edges thereof provided with transverse slots, a rigid fitting on which said vamp is mounted, provided with surfaces which said projections slidably over-lap, said fitting comprising a forwardly extending brace member the front end of which is fixed to the toe of said vamp, studs secured in said fitting which engage the slots in the projections on said vamp, an expansion member mounted on said fitting arranged to maintain said vamp at the limit of its expansion, a rigid thrust member, a pivot joint connecting said thrust member with the fitting of the foot portion of the tree, and an abutment member secured to the outer end of said thrust member arranged to react against the heel of a shoe to which the tree is applied.

21. The tree specified in claim 20, the thrust member of which is of turn-buckle construction, and the joints for pivotally connecting said thrust member to cooperating parts of the tree are constructed and arranged to permit turning of said foot portion in different directions to facilitate adjusting said tree to a shoe to which it is being applied.

22. The tree specified in claim 20, the expansion member of which consists of a coil spring inserted under compression between the sides of the vamp portion of the tree, and the fitting mounted on said vamp comprises a sleeve in which said coil spring is confined, and plugs slidably fitted to opposite ends of said sleeve, against which said coil spring reacts.

FRED P. MEYER.